United States Patent [19]

Meissner

[11] 4,213,382
[45] Jul. 22, 1980

[54] SELECTIVE PITTER FOR FRUITS OF THE DRUPE TYPE

[75] Inventor: Konrad E. Meissner, Lafayette, Calif.

[73] Assignee: California Processing Machinery, San Ramon, Calif.

[21] Appl. No.: 880,229

[22] Filed: Feb. 22, 1978

[51] Int. Cl.³ .......................... A23N 4/04; A23N 4/22
[52] U.S. Cl. ........................................ 99/486; 99/551; 99/553; 99/554
[58] Field of Search .................................. 99/489–491, 99/544, 545, 547, 548, 551–554, 562, 563; 426/485

[56] References Cited

U.S. PATENT DOCUMENTS

| | | |
|---|---|---|
| 1,785,019 | 12/1930 | Thompson et al. |
| 1,785,021 | 12/1930 | Whipple. |
| 1,785,022 | 12/1930 | Duncan. |
| 1,949,641 | 3/1934 | Awa et al. .......................... 99/553 |
| 3,331,418 | 7/1967 | Amori. |
| 3,465,799 | 9/1969 | Tomelleri .......................... 99/553 |
| 3,829,591 | 8/1974 | Browne .......................... 99/553 |
| 4,054,675 | 10/1977 | Spence .......................... 426/485 |

Primary Examiner—Harvey C. Hornsby
Assistant Examiner—Timothy F. Simone
Attorney, Agent, or Firm—Limbach, Limbach & Sutton

[57] ABSTRACT

Apparatus and methods are described for pitting fruit of the drupe type, in which fruit having sound pits are torque pitted and fruit having split pits are spoon pitted. A coring spoon is spaced from the pit gripping portion of the fruit bisecting blades with spoon pitting being accomplished by moving the blades and coring spoon through the fruit and betwen the halves of the split pit to move the fruit gripping portions of the blade away from the split pit and bring the coring spoon adjacent the pit for cutting a core, including the split pit, from the fruit.

8 Claims, 10 Drawing Figures

SELECTIVE PITTER FOR FRUITS OF THE DRUPE TYPE

BACKGROUND OF THE INVENTION

This invention relates generally to the field of methods and apparatus for pitting fruits of the drupe type. More particularly, it relates to apparatus for selectively torque pitting such fruit having sound pits and for automatically and selectively spoon pitting such fruit having split pits, irrespective of the order in which fruit having sound pits and fruit having split pits are presented to the pitting station.

The most common method and apparatus used in pitting fruits of the drupe type, such as peaches, apricots and the like, provide for torque pitting the fruit. In this technique the fruit body halves are substantially bisected and the pit is gripped against rotation while the fruit body halves are rotated relative to and about an axis extending through the pit, thus twisting the fruit body havles free of the pit. However, it is not uncommon for some of the fruit presented to the pitting station to have unsound or split pits, these fruits being intermingled with other such fruit having sound pits. If the torque pitting technique is used with fruit having a split pit, generally all that is accomplished is the bisecting of the fruit and its split pit into two halves and then passing the fruit body halves with their attached pit halves onto subsequent stations where these fruit body halves must be repitted with a coring spoon to remove the split pit halves.

One seemingly obvious solution to the problem is use a spoon pitting machine to cut a core including the split pit from each of the fruits presented, regardless of whether the fruit has a split or sound pit. However, since a spoon pitting machine must necessarily cut a core from each fruit at least as large as the largest pit anticipated, it necessarily removes some of the pulp, or meat, adjacent the pit in order that it may stay clear of the pit itself. This causes a loss of salable fruit pulp from fruit having sound pits, which loss would not occur had torque pitting been used. Various compromise solutions to this problem have been attempted by canners. One such solution has been the provision of separate torque pitting and spoon pitting lines in the canneries with batches of fruits suspected of having a high incidence of split pits being processed along the spoon pitting line and all other fruit being processed along the torque pitting line. This compromise has been unsatisfactory both in its requirement for different sets of torque pitting and spoon pitting equipment, some of which may lie idle if fruit having split pits or sound pits is not available. Additionally, there likely will remain the requirement for spoon pitting the still substantial number of split pit fruit processed along the torque pitting line.

An improvement over the initial compromise may be found by using equipment similar to that disclosed in Brown U.S. Pat. No. 3,829,591 in which a single machine may be configured to operate in a torque pitting mode or, by appropriate modification, to operate in the spoon pitting mode. The apparatus of Brown thus reduces the necessity for separate types of equipment. However, the Brown apparatus operates continuously in the selected one of the two modes, regardless of whether the fruit presented has split or sound pits, until the processing line is shut down and the machine altered to operate continuously in the other mode. Thus, this Brown apparatus may still attempt torque pitting on fruit having split pits or may spoon pit a substantial number of fruit having sound pits, an inefficient procedure in either condition.

A further advance has been effected by the selective pitting apparatus of Spence U.S. Pat. No. 4,054,675, in which a single pitting apparatus detects the presence of split or sound pits and adjusts the apparatus accordingly. Thus, with the Spence apparatus fruit having sound pits may be torque pitted, to reduce the loss of available fruit pulp, while fruit having split pits would generally be spoon pitted, as required. By the provision of such selective apparatus the unnecessary and wasteful duplication of equipment may be reduced and a substantially higher yield of properly pitted fruit obtained. However, even when the Spence apparatus is in its spoon pitting mode, it requires that the fruit halves be rotated through a full circle relative to a stationary coring knife and about an axis normal to the plane of the fruit suture, a procedure which may both tear the pulp of the fruit and may also cut the core substantially larger than necessary for removal of the pit.

SUMMARY OF THE INVENTION

To overcome the disadvantages of the prior art, it is an object of the present invention to provide a drupe pitting method and apparatus in which the fruit presented may be selectively torque pitted or spoon pitted as required by the apparent soundness or unsoundness of its pit. It is a further object of this invention to achieve such pitting with a minimum loss of edible fruit pulp.

To achieve the foregoing as well as other objects, a method and apparatus are provided for selective pitting of drupes having either sound or unsound pits. This method and apparatus provides for presenting and supporting the fruit at a single pitting station with its suture substantially in a predetermined plane, substantially bisecting the body of the fruit in that plane and moving opposed pit gripping means to the body of the fruit in the plane toward the edges of the pit. If the pit is sound, the pit gripping means grip the pit and hold it against rotation while the halves of the fruit body are rotated relative to the pit to shear the fruit body halves from the sound pit. If the pit is split, as indicated by movement of the pit gripping means past the pit gripping position into the pit, the pit gripping means are shifted away from the pit and through the fruit body to bring a coring spoon, which is spaced from the pit gripping means, into a position in the plane which is adjacent the split pit. Then the coring spoon is rotated about an axis extending through the split pit such that the coring spoon rotation describes a body of revolution and cuts a core, including the split pit, corresponding to the body of revolution from the fruit halves.

DESCRIPTION OF A PREFERRED EMBODIMENT

Figure 1:
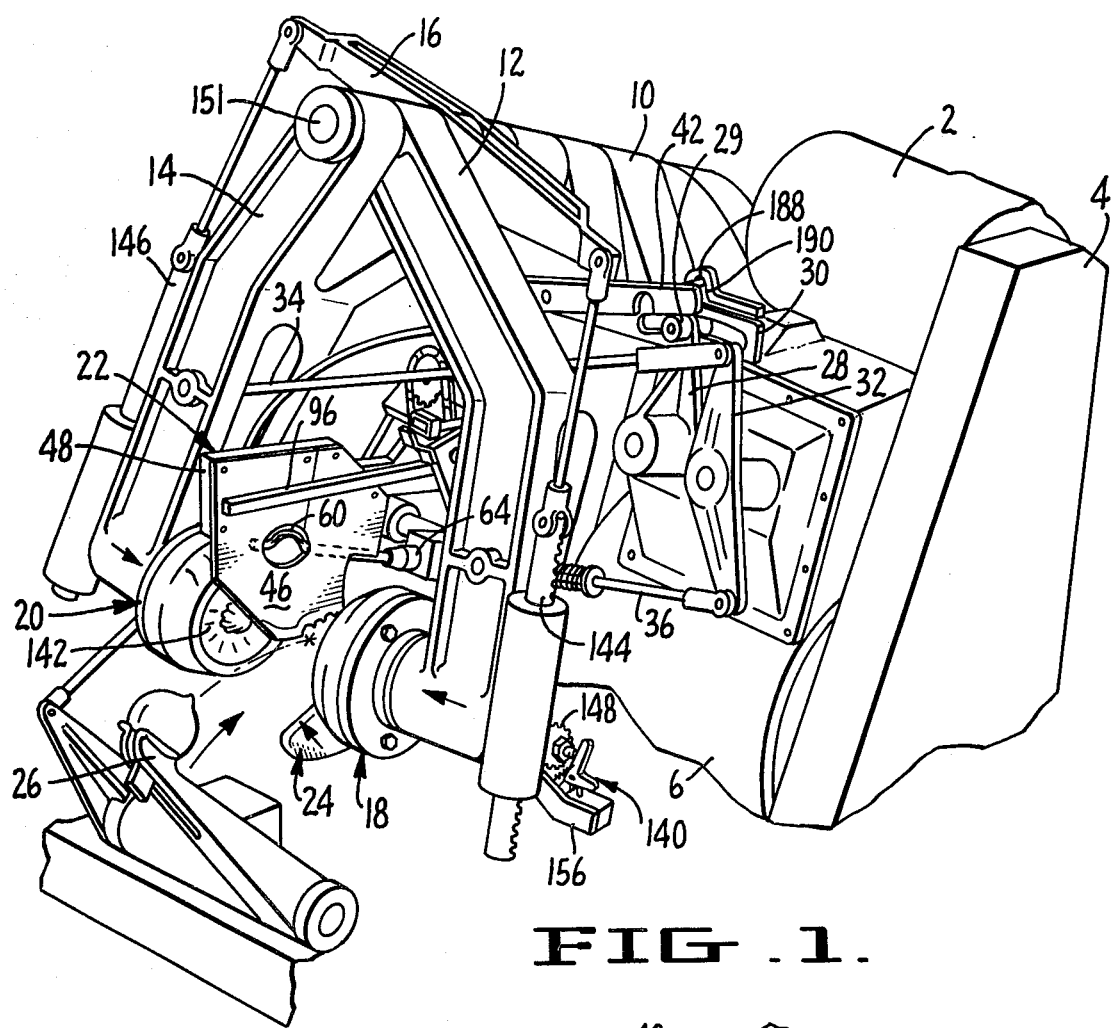
FIG. 1 is a partial front perspective view of the apparatus of this invention and of one form of apparatus suitable for practicing the method of this invention.
Figure 2:
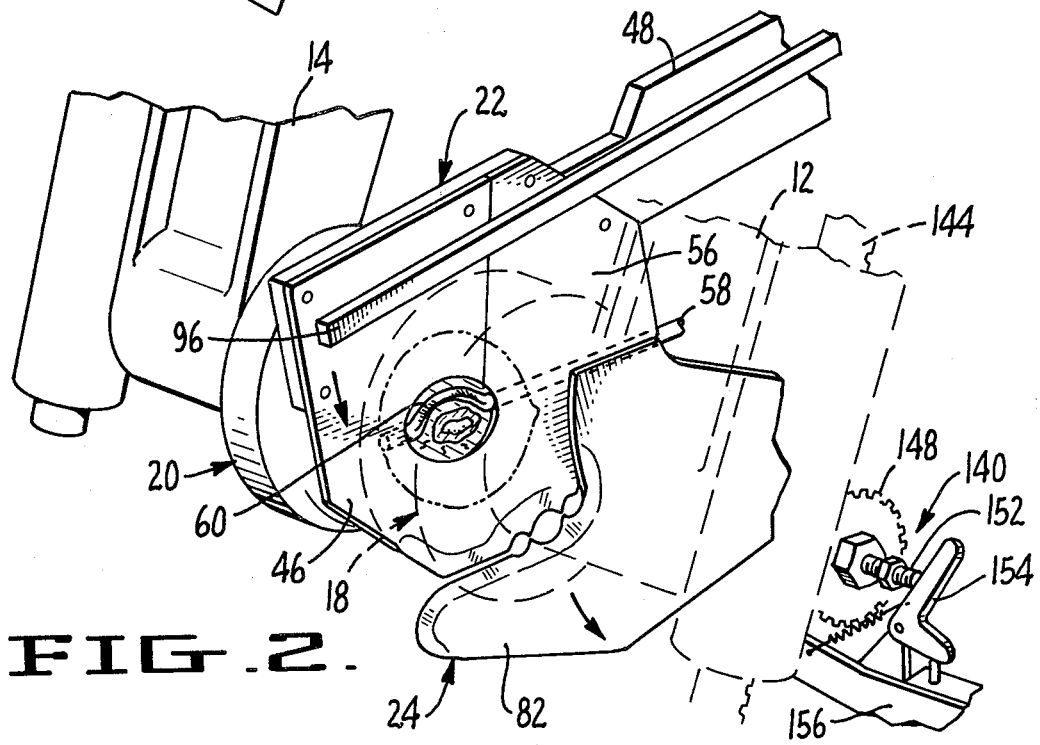
FIG. 2 is an enlarged view of a portion of the apparatus of FIG. 1 illustrating the fruit body bisecting blades shifted to bring the coring spoon into position for spoon pitting a drupe.

A particularly preferred embodiment for practicing the teachings of this invention is illustrated in the drawings. This apparatus may suitably comprise a modification of the torque pitting apparatus disclosed in U.S. Patent Application Ser. No. 822,669 filed Aug. 8, 1977, in the name of Jesus Antonio Silvestrini and owned by the assignee of the present invention. Additionally incorporated in this apparatus is the fruit sensing structure of my co-pending application entitled "Improved Drupe Pitting Machine Having Apparatus for Preventing Deformation of the Fruit Gripping Structure When the Machine is Operated With no Fruit Present," and assigned to the assignee of the present invention. Since the present assignee is the owner of both of these prior and co-pending applications, the entire disclosures of those two applications are incorporated herein by reference. Substantial portions of those co-pending prior applications, such as the detailed configuration and operation of the gripper heads and of the fruit sensing apparatus, which form no direct portion of the present invention, have been omitted from the illustrations and from this detailed description in order to clarify the subject matter of the present invention.

As illustrated in FIG. 1, this apparatus comprises, in general, a motor 2 which is connected by a belt, not shown but behind guard 4, to gear box and cam housing 6 in which various cams and gears are contained for providing the necessary mechanical action to the apparatus. The gear box and remainder of the pitter is mounted on a frame 8, a fragment of which is shown. Extending out from the upper portion of the gear box 6 is the support 10 to which are pivotally mounted the gripper head arms 12 and 14 and the gripper head rotating bell crank 16. Adjacent the lowermost extremities of each of the gripper head arms 12 and 14 are the respective fruit body gripper head assemblies, generally indicated by the reference numerals 18 and 20. Disposed between the two gripper head assemblies 18 and 20 is upper blade assembly 22 and movable lower blade assembly 24. A cup feeder 26 is pivotally mounted by shaft 27 to the frame 8 for movement toward and away from jaw assemblies 22 and 24. A bell crank 32, pivotally mounted to and driven by the gear box 6, is connected by an upper push rod 34 to pivotally mounted gripper head arm 14 and by lower push rod 36 to the other pivotally mounted gripper head arm 12. Thus, the clockwise rotation of the bell crank 32 will serve to pivot the two arms 12 and 14 to bring the gripper head assemblies 18 and 20 together, with counterclockwise rotation of the bell crank 32 moving those gripper heads apart.

Figure 3:
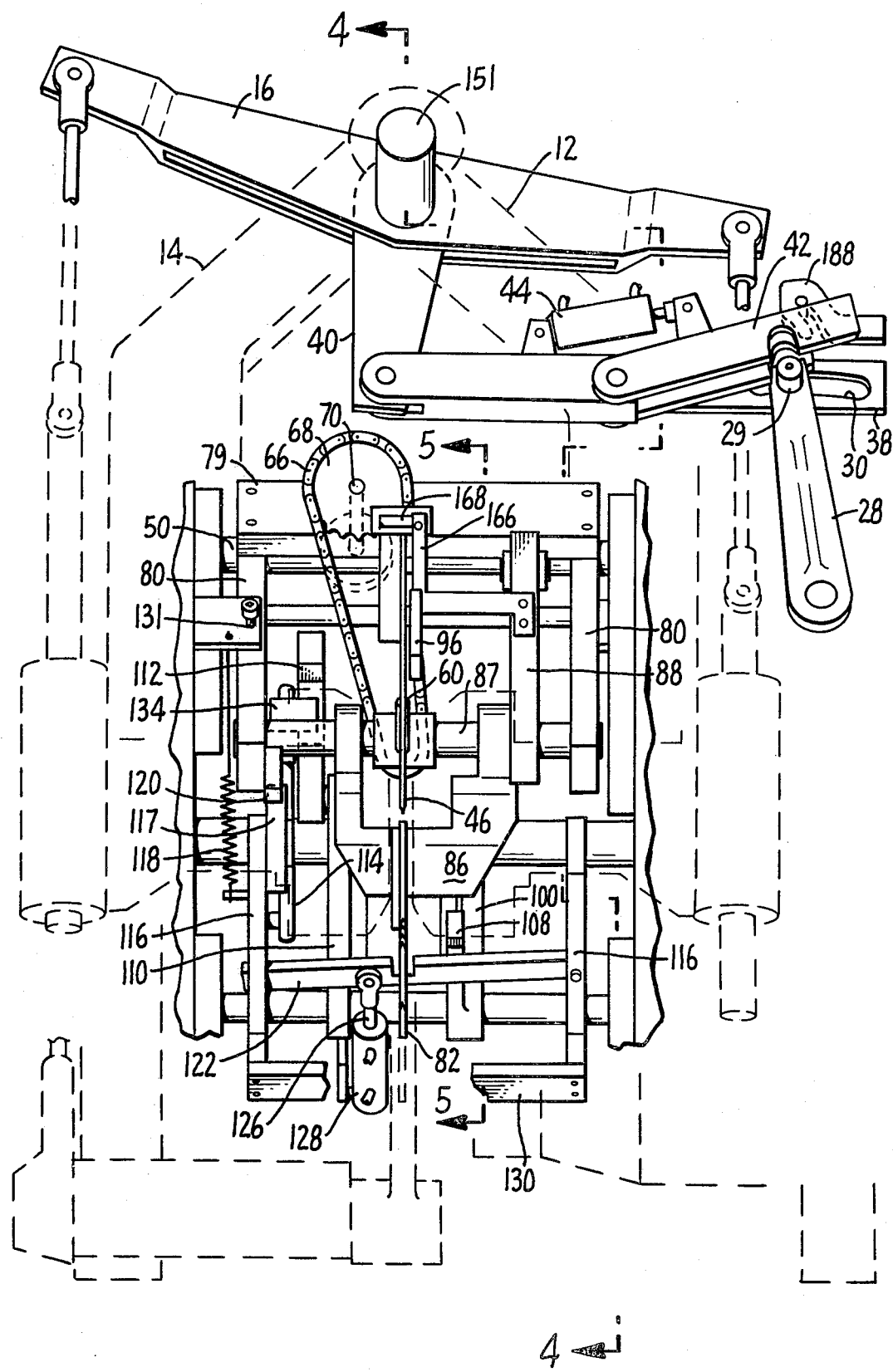
FIG. 3 is a front elevation, partially in phantom, of the apparatus of FIG. 1.

As shown in FIG. 1 and more clearly in FIG. 3, a crank arm 28, also pivotally mounted to and driven by the gear box 6, has a pair of projections 29 at its outer end, one of which projections rides in a slot 30 adjacent the end of linkage member 38. This linkage member 38 is pivotally connected to a downwardly extending arm 40 of bell crank 16. Pivotally mounted to a portion of the linkage member 38 intermediate the slot 30 and the connection to the arm 40 is a latching link 42. This latching link 42 is pivotally mounted at one end to the arm 38 and contains a cut-out adjacent its opposite end, such cut-out being dimensioned and configured to fit around the projections 29 of the crank arm 28. An actuator, such as air cylinder 44 serves to pivot the link 42 about its pivotal connection, in a manner and for a purpose to be described below.

Figure 4:
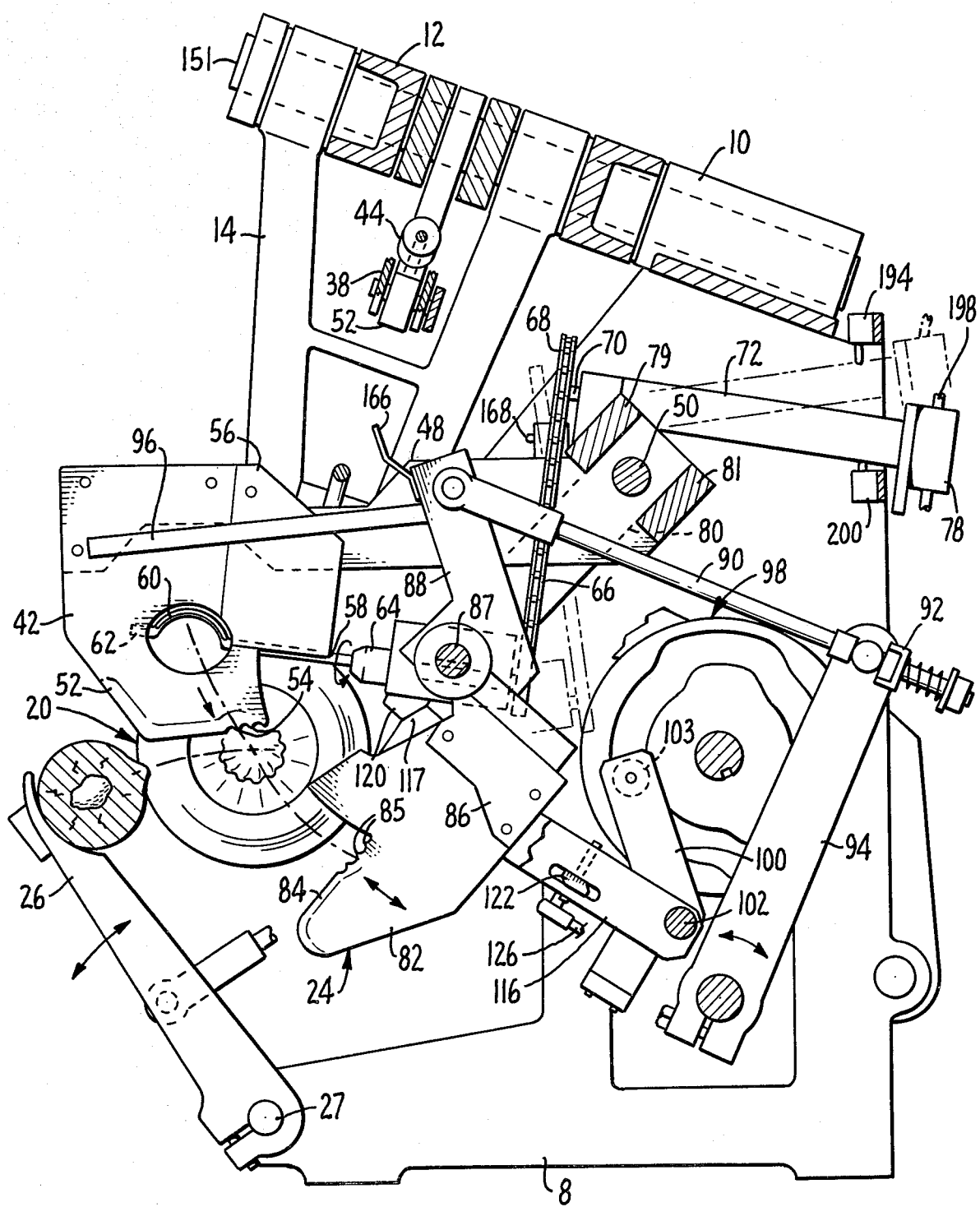
FIG. 4 is a side sectional view, taken along line 4—4 of the apparatus of FIG. 3.
Figure 5:
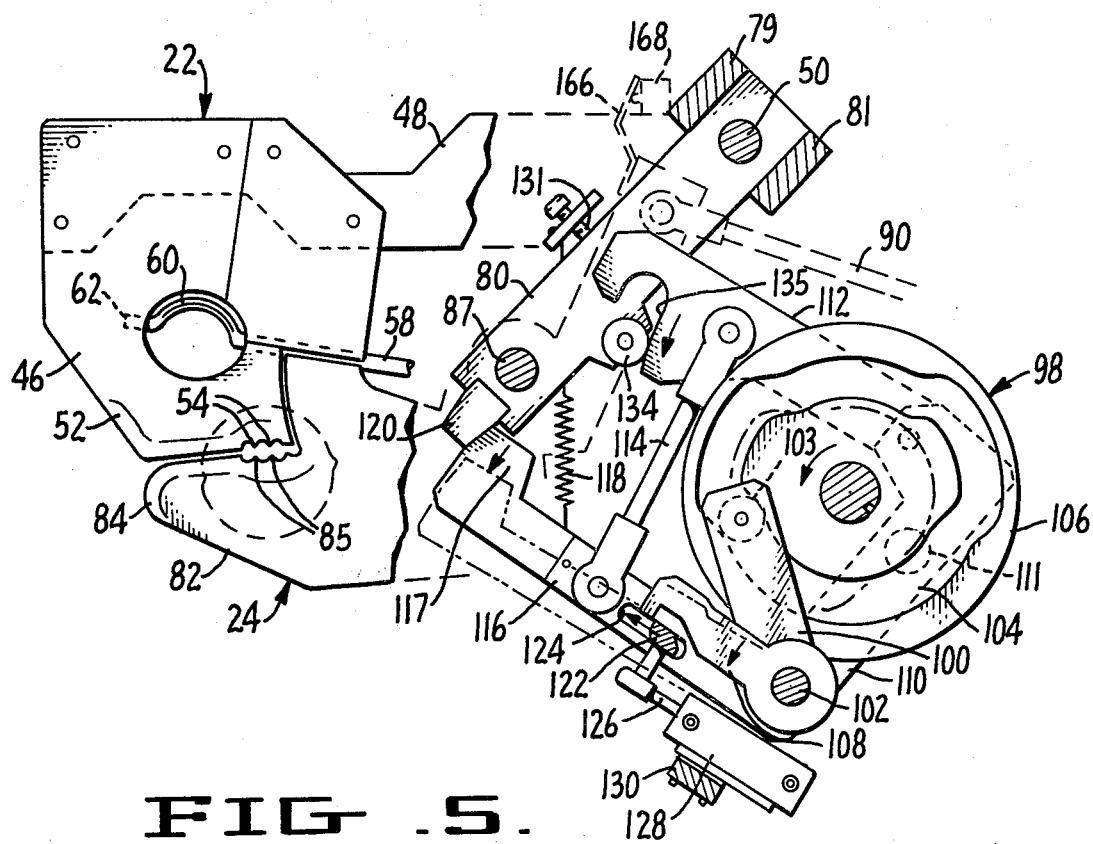
FIG. 5 is a side sectional view, taken along line 5—5, of a portion of the apparatus of FIG. 3.
Figure 6:
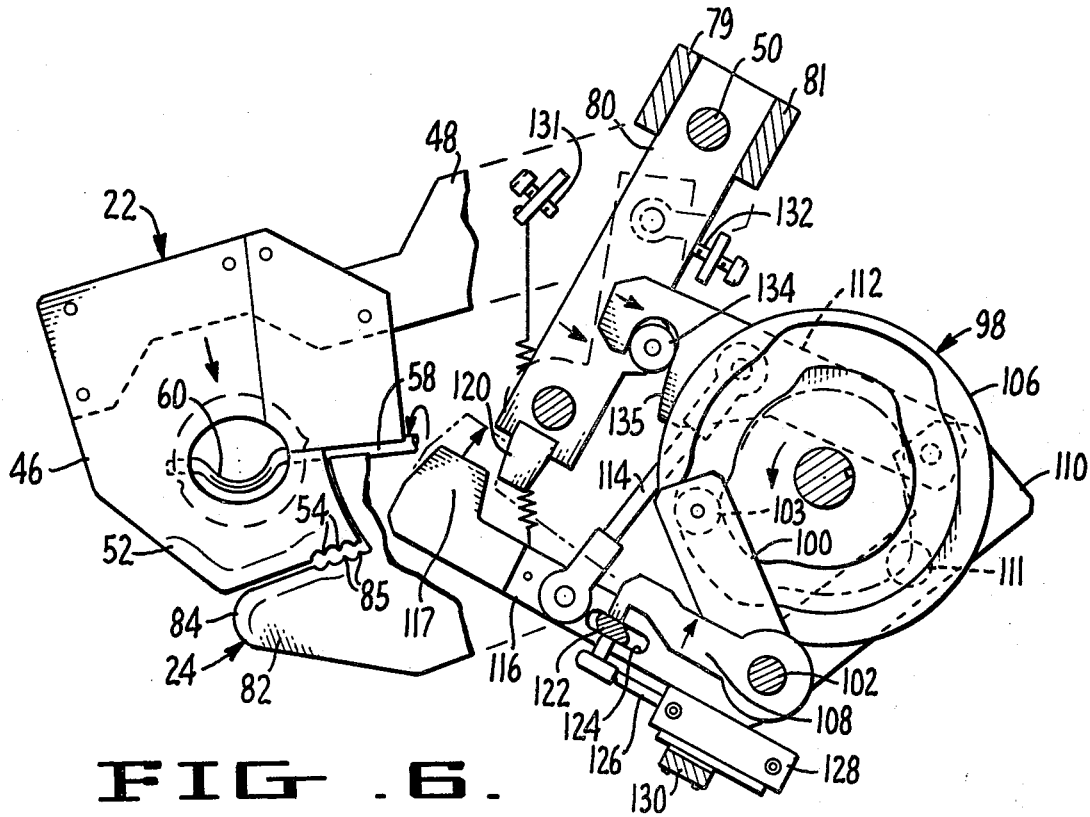
FIG. 6 is a side sectional view, corresponding to FIG. 5, with the cutting blades shifted to the spoon pitting position.

The jaw or blade assemblies 22 and 24 are best illustrated in the side sectional views of FIGS. 4-6. The upper blade assembly comprises generally cutting and pit gripping blade 46 rigidly affixed to mounting arm 48, which in turn is pivotally mounted to the pitting apparatus chassis by shaft 50. The cutting blade 46 includes on its forward and lower portions sharpened cutting surfaces 52, including a plurality of pit gripping teeth 54.

Immediately adjacent and behind blade 46 is coring spoon support 56, which suitably is of metal plate material similar to that of the blade 46 and also is rigidly affixed to support 48. Along the lowermost edge of the coring spoon support 56 is provided a groove which rotatably receives the shaft 58 of coring spoon 60. Coring spoon 60, as illustrated, is generally U-shaped with shaft portions 58 and 62 extending outwardly from the ends of the legs of the U. Shaft portion 62 is rotatably received into a journal formed within blade 46 adjacent the aperture within which the spoon 60 is housed. By the support of the shaft 58 in the groove on support 56 and the bearing portion 62 within the journal in blade 46, the spoon is thus supported for rotation about an axis extending generally transverse to the legs of the U. The end of shaft 58 remote from the spoon 60 is received into a bearing mount 64. On the opposite side of bearing mount 64 a sprocket is mounted to the shaft 58, which sprocket engages drive chain 66 which is also received about a sprocket 68 which, in turn, is mounted to a shaft 70 extending through housing 72 and driven by a suitable rotary actuator 78, which may be pneumatically operated and mounted to the back end of housing 72. Both the bearing support 64, and the housing 72 with actuator 78 are rigidly connected to supports 80, which are rigidly joined together by cross members 79 and 81 and are thus affixed to the upper blade support 48 and which are similarly supported for pivoting motion about shaft 50, in a manner to be described below.

The lower blade or jaw assembly 24 includes lower blade 82 having a sharpened cutting edge 84 with a plurality of pit gripping teeth 85. This lower blade 82 is rigidly affixed to blade mount 86, which in turn is rigidly affixed to or integral with actuating arm 88. The outer end of actuating arm 88 is connected by control rod 90 through a spring-biased lost motion linkage 92 to crank arm 94, which is driven by the gear and cam assembly in a manner to be described below. A pit knocker 96 extending parallel to the upper blade 46 is also attached to the upper end of actuating arm 88.

The respective blade assemblies are capable of two different modes of movement. In a first mode the upper blade assembly 22 remains stationary while clockwise pivoting of the crank arm 94 moves control rod 90 and thus control arm 88 to pivot the lower blade 82 and its mounting 86 toward the upper blade 46 in the manner indicated in FIGS. 4 and 5.

A seccond type of movement of the blade assembly is illustrated in FIG. 6 in which the lower blade assembly 24 has been pivoted into close proximity with the upper blade assembly 22, and then both blade assemblies together have been pivotally moved a predetermined amount in a counterclockwise direction about shaft 50. This second mode of pivoting is effected under control of the rotary cam assembly 98 and associated linkages in the following manner.

Cam follower arm 100, pivotally mounted to shaft 102 which is mounted to the pitter chassis, carries at the end opposite the pivotal mounting a cam follower 103 which rides in the cam groove 104 of the rotary cam 106. The engagement of the cam follower 103 with the cam track 104 effects an oscillating pivotal movement of the arm 100 about the shaft 102. Rigidly connected to arm 100 is actuator cam 108, and pivotally connected to arm 100 is linking arm 110, with arm 110 being pivotally connected to latch arm 112. A cam follower 111 is attached to linking arm 110, and rides in another cam groove (not shown) on the opposite side of rotary cam 106. Latch arm 112 is pivotally connected by linkage 114 to arm 116, which is biased upwardly about the pivot shaft 102 by biasing spring 118. To the end of arm 116 distal the pivot 102 is rigidly mounted blocking arm 117 (FIG. 5) in blocking engagement with a tooth 120 projecting downwardly from the lowermost extremity of the arm 80 which is pivotally mounted to shaft 50, and which is rigidly joined to upper blade support 48 and carries the pivot shaft 87 supporting lower blade 82.

As shown most clearly in FIG. 3, a cross link 122 is pivotally mounted to the right-hand member 116' and slides in a slot 124 in left-hand member 116. This cross link 122 is connected by push rod 126 to an actuator 126, which suitably may be an air cylinder actuator, for moving the cross link 122 back and forth within the slot. In FIG. 5 this cross link 122 is shown in its rearward position within the slot 124, and in FIG. 6 it has been moved to its forward position within that slot. With the cross link 122 in the rearward position of FIG. 5, limited counterclockwise pivoting of the arm 108 under the influence of cam 106 and cam follower arm 100 will cause the hooked portion at the outermost extremity of that member 108 simply to reciprocate in front of cross link 122. However, when the cross link 122 has been moved to its forward position, as in FIG. 6, this limited counterclockwise movement of the member 108 about pivot 102, under the influence of the cam assembly 98, will cause the outermost end of that member 108 to force the cross link 122 downwardly. Since cross link 122 is mounted to the arms 116 and 116', such downward movement of the cross link 122 effects corresponding counterclockwise (in FIG. 6) pivoting of the arms 116 and 116', which are rigidly joined by a cross member 130. Such counterclockwise pivoting of the arm 116 moves the blocking arm 117 below and out of the way of tooth 120 at the lower end of arm 80. Thus, arm 80, supporting the lower jaw assembly 24 and connected to upper jaw assembly 22 is permitted to pivot counterclockwise (downwardly) about the pivot 50 away from upper stop 131 until it engages lower stop 132.

The pivoting of the arm 80 is effected by the hooking of boss 134, affixed to arm 80, by the hooked end portion of latching arm 112 and movement of that arm 112 in a rearward and downward direction under the influence of rotary cam 106. This action is effected by the movement of cam follower 111 on arm 110 within its track on cam 106, which track effects a clockwise pivoting of the arm 110 about pivot shaft 102, as illustrated in FIG. 6. At any time that blocking member 117 is moved out of engagement with tooth 120 on member 80, as illustrated in FIG. 6, the boss 134 is supported by engagement against the downwardly extending rear surface 135 of the hook at the end of hooking member 112. Thus, as the cam follower 111 is driven by its cam track (broken line) on cam 106 both the member 110 and the link 114 will be pivoted to the rear, thus moving the hooked end portion of hooking link 112 to the rear and downwardly and capturing the boss 134 within the hook by the downward pivoting of arm 116 which, through link 114, pulls arm 112 downwardly also, as illustrated in FIG. 6. This holding of the boss 134 both allows the lowering of the arm 80 and its associated blade assemblies by movement of hook 112 and continues to hold it until the movement of cam follower 103 around its cam track permits the arm 116 and its blocking member 117 to swing up in front of the blocking tooth 120 to latch the arm 80 and its blade assembly in their lowered position of FIG. 6. Further operation of this actuating apparaus will be described below.

The detailed description of the fruit gripping heads 18 and 20 and their method of operation are described in detail in the above-referenced co-pending Silvestrini application. As noted above, these gripper heads 18 and 20 are located adjacent the lower extremities of the pivotally mounted arms 12 and 14, respectively. When these arms 12 and 14 are pivotally moved toward one another, by the action of bell crank 32, the gripper heads are brought into coaxial engagement with the outer surfaces of a fruit presented to the pitter by feed arm 26. These gripper heads 18 and 20 thus grip the fruit on opposite sides of the plane defined by the blade assemblies 22 and 24, the suture of the fruit also being oriented to lie generally in such plane. Sensing apparatus, generally indicated by the reference number 140 and corresponding to that disclosed in my above-referenced co-pending application, senses the presence or absence of a fruit when the gripper head assemblies are closed toward one another, to prevent undesired inflation of the pneumatically controlled gripper cups 142 if no fruit is present.

When torque pitting is desired with this apparatus, the gripper heads 18 and 20 are rotated about their common axis, which is substantially normal to the plane of the blades and the suture, by movement of the racks 144 and 146, which engage pinions 148 and 150 (not shown) which are connected to the gripper heads 18 and 20, respectively. The racks are moved in a generally vertical direction by the oscillation of the bell crank 16 under the influence of crank 28 driven by the gear and cam assembly 6.

Figure 7:
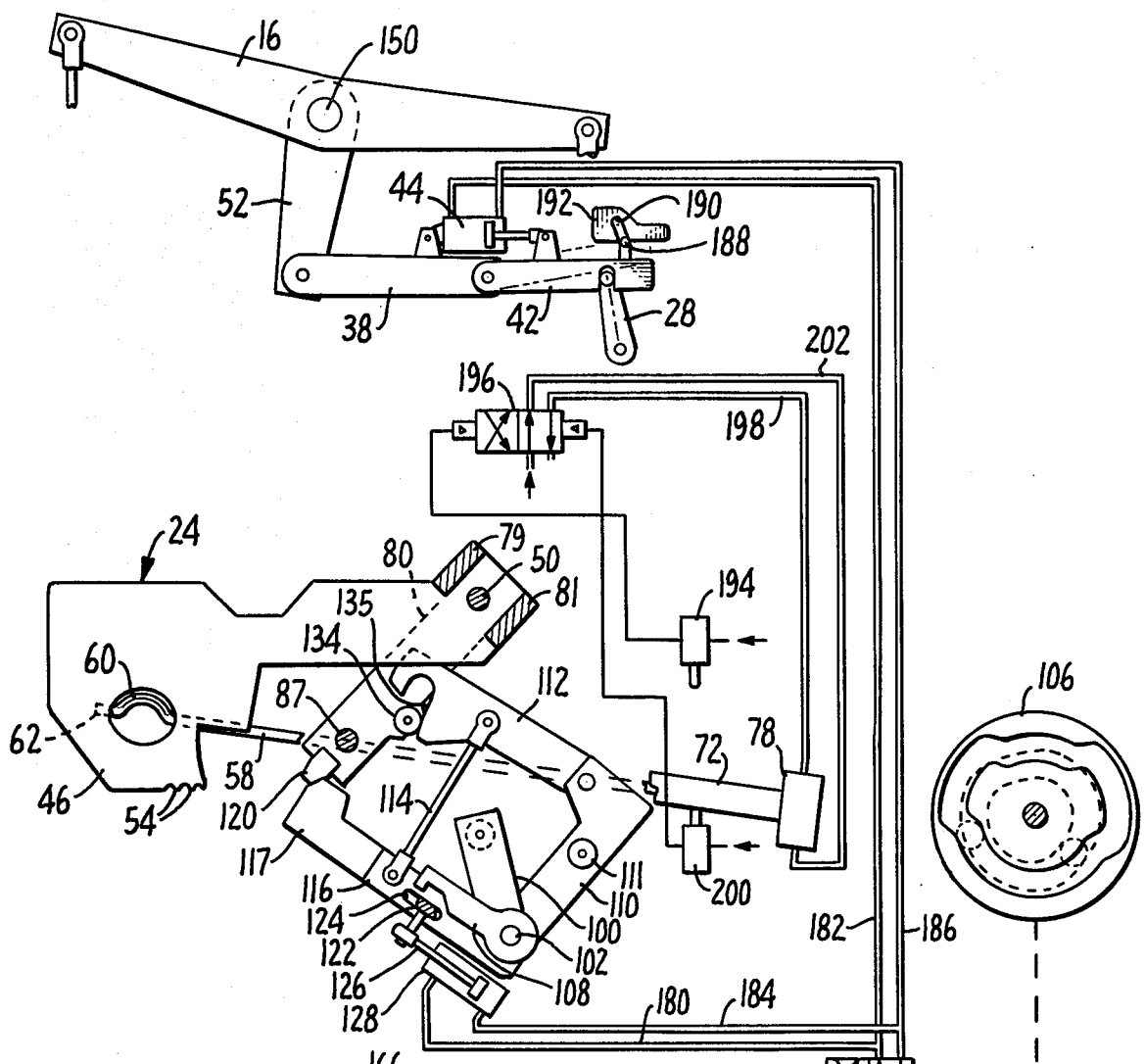
FIG. 7 is a schematic representation of the cam and pneumatic system arrangement of the apparatus of FIG. 1.
Figure 7:
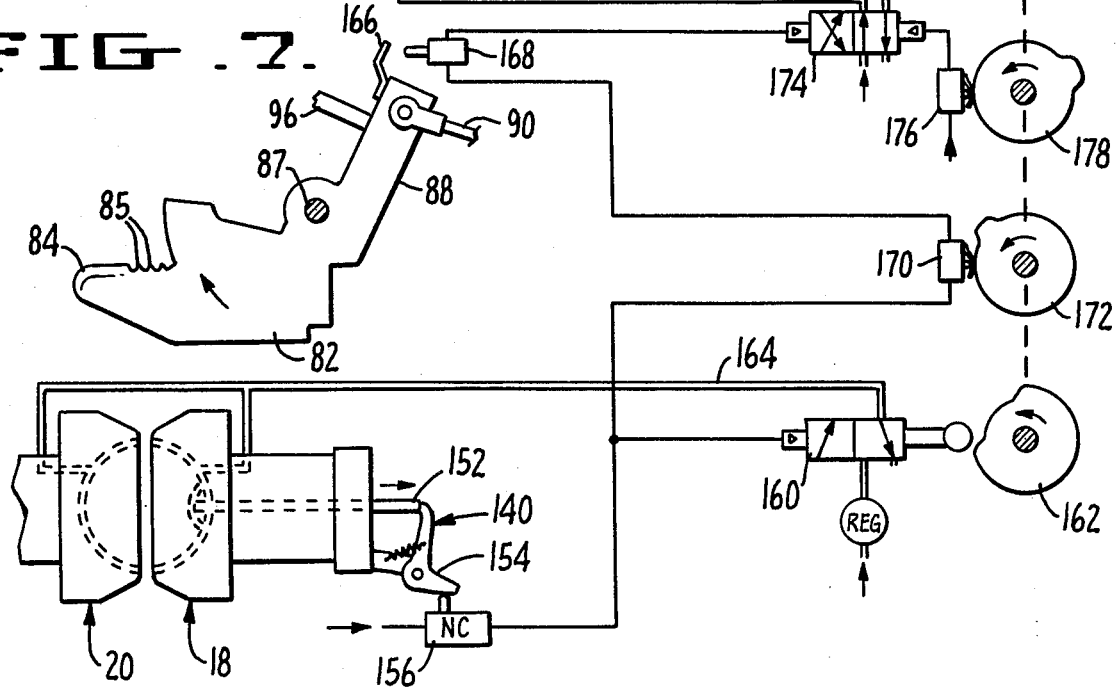
Figure 8:
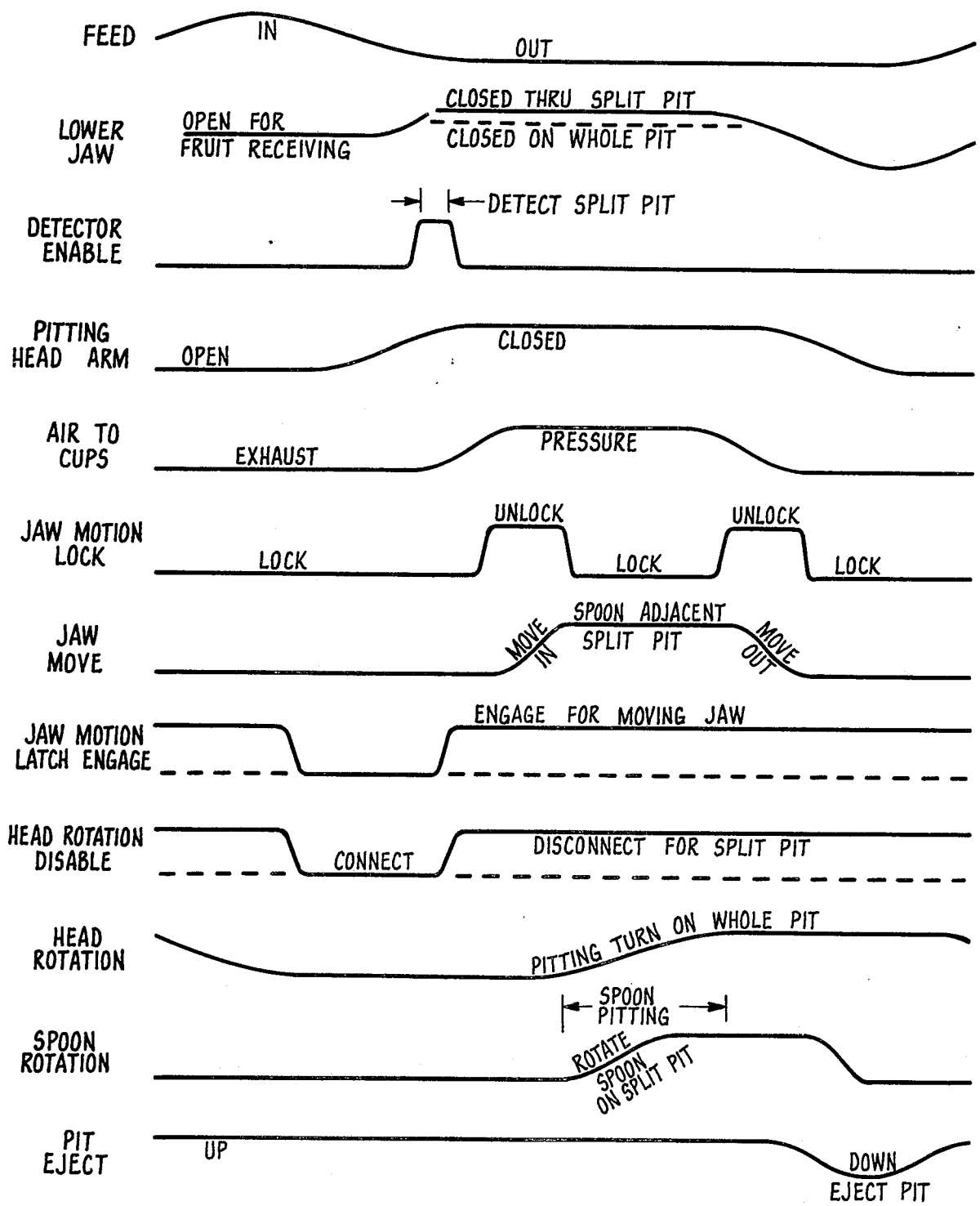
FIG. 8 is a timing diagram of the apparatus of FIG. 1.

Preferably, the various motions and operations of this apparatus are controlled by combination of cams and linkages and air cylinders, which are illustrated schematically in FIG. 7, in which the various functional components are exploded for clarity of explanation. The manner of operation of this apparatus may be seen from the schematic diagram of FIG. 7 and the timing diagram of FIG. 8 and is generally of the following manner.

When a drupe, such as a peach, is to be presented by feed cup 26 to this apparatus for pitting, it has previously been oriented and positioned in the feeding cup 26 such that the suture or seam of the fruit lies generally in the same plane as the blades 46 and 82. Preferably, the blossom end of the fruit is presented first into this apparatus. At this time the blade assemblies 22 and 24 are generally in the open position indicated in FIG. 1 such that the fruit held in the feed cup 26 may be inserted between the blades. As previously noted, the edges 52 and 84 of the respective blades are sharpened, with the rear portions of the blades being provided with the pit gripping teeth 54 and 85. Thus, as the fruit feeding arm and cup 26 pivots toward the jaw assembly, the fruit is inserted onto and received by the cutting edges 52 and 84 of the upper and lower blades 46 and 82, with those blades producing a partial cut in the pulp or meat of the fruit and with the feeder 26 forcing the fruit to the rear of the opening between the jaws until the pit engages the upright rear portion of the lower blade and stops further insertion. It may be noted from FIG. 1 that the feeding arm 26 is provided with a slot so that the arm may straddle the upper and lower blades as it inserts the fruit into the gap between the blades.

Figure 9:
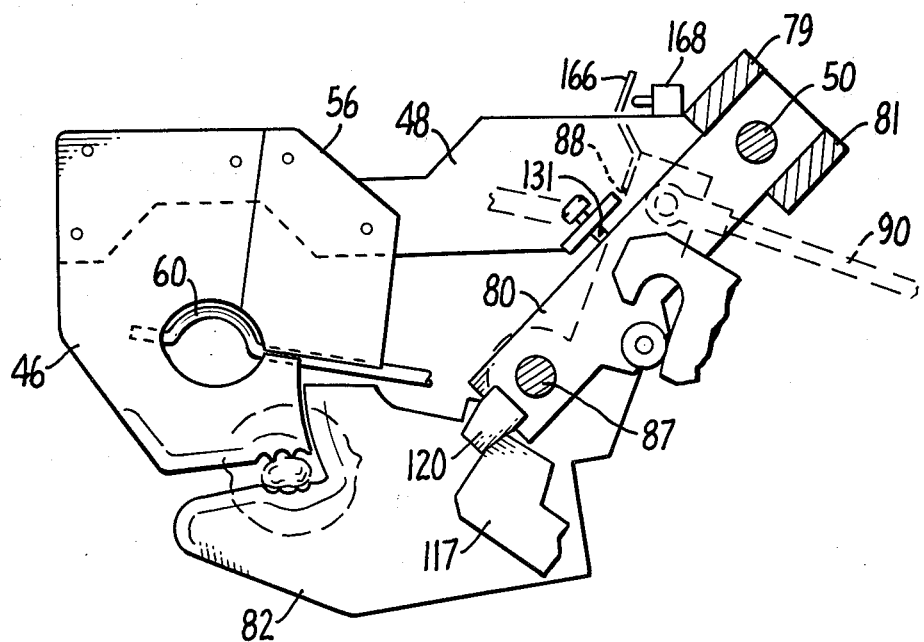
FIG. 9 is a fragmentary side sectional view, similar to FIG. 5, but showing the apparatus in its pit gripping configuration for torque pitting.
Figure 10:
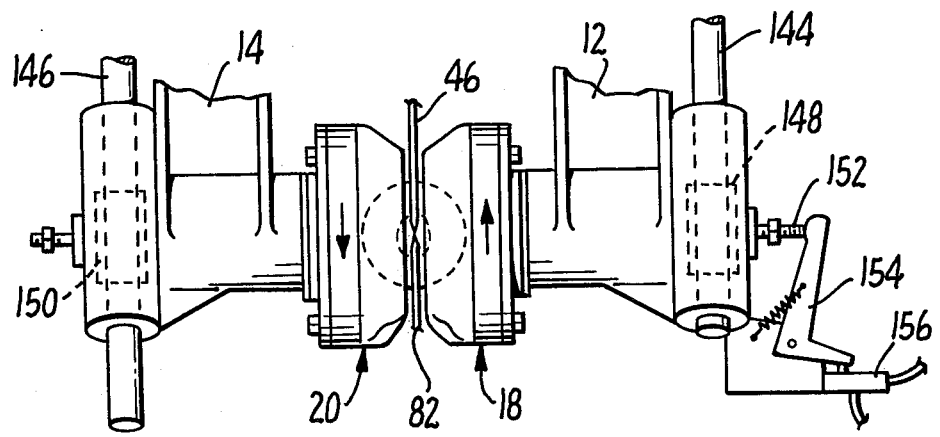
FIG. 10 is a fragmentary front elevation illustrating the operation of the gripper heads for torque pitting a fruit having a sound pit.

When the fruit has been fully inserted into the space between the upper and lower blades 46 and 82, the lower blade 82 is pivoted toward the upper blade 46 under the action of crank arm 94 and push rod 90, which are driven by the gear and cam assembly 6. If the fruit has a sound pit, the pivoting of the lower jaw continues until the lower teeth 85 and upper teeth 54 engage and grip the pit of the fruit as illustrated in FIG. 9.

When the upper and lower blade 46 and 82 have closed, and thus gripped the pit of the fruit to hold it against rotation, the sharpened edges 52 and 84 of the blades have also at least partially cut through the pulp or meat of the fruit generally in the plane of the suture, thus defining two fruit halves which are adhered to the pit.

At substantially the same time as the closing of the jaws, driven by the gear and cam arrangement inside housing 6, that same gear and cam system effects a counterclockwise rotation of the bell crank 32. The motion of bell crank 32 is thus transmitted through push rod assemblies 34 and 36 to pivot the respective arms 12 and 14 about the frame mounted pivot 151 from the position illustrated in FIG. 1 to that illustrated in the broken line representation of FIG. 3. This pivotal movement of the arms 12 and 14 thus brings the opposed gripper head assemblies 18 and 20 from a location distal the upper and lower blades to a position proximal those blades, and on opposite sides of the blades and the plane defined thereby, so that the gripper heads 18 and 20 are positioned adjacent the respective fruit halves for gripping those fruit halves.

Generally in the manner described in detail in my co-pending application entitled "Improved Drupe Pitting Machine Having Apparatus for Preventing Deformation of the Fruit Gripping Structure When the Machine is Operated With no Fruit Present" the engagement of the fruit by the gripper head 18 urges the actuating rod 152 outwardly, thus pivoting the arm 154 clockwise and opening the normally closed air valve 156 to permit pressurized air into the line extending from that valve. Such air then urges the bobbin of valve 160 toward the right in FIG. 7, such that the bobbin will move to the right when the cut-out portion of cam 162 rotates past the valve 160 cam follower. This movement to the right of the valve 160 bobbin thus permits the introduction of pressurized air into the line 164 extending to the gripper heads 18 and 20, such that the gripper diaphragms within those head assemblies may be inflated to resiliently grip the opposed fruit halves in the manner described in detail in the above-referenced Silvestrini patent application.

As illustrated in FIG. 9, the engagement of the fruit pit between the teeth on the upper and lower blade stops further pivoting of the lower blade 82 toward the upper blade and thus prevents actuating tab 166 from depressing the plunger and opening the normally closed valve 168. Thus, the pressure in the line caused by the opening of valve 156 may flow through normally closed valve 170 when it is momentarily opened by the bump on cam 172, but will be stopped at valve 168 for a fruit having a sound pit. In this event, there will be no pressure to urge the bobbin of valve 174 to the right in FIG. 7. In such an event, there will be no air pressure from valve 168 to the left side of valve 174 to shift it from the leftward position (illustrated in FIG. 7) to which it had been previously shifted by momentary opening of valve 176 and introduction of pressurized air to the right side of valve 174. In this condition the pressurized air entering valve 174 flows through conduits 180 and 182 to hold both cylinders 128 and 44 in their rightward positions, as illustrated in FIG. 7.

With cylinder 128 in its rightward position, the cross link 122 is held toward the rear of slot 124. In this event, as arms 100 and 108 are pivoted counterclockwise under the influence of cam 106, the outer extremity of arm 108 will fall past the edge of the cross link 122 and cause no movement of the arm 116 or of blocking tooth 117. Thus, the upper blade assembly 24 will be held in its raised position.

By the urging of the piston of cylinder 44 to the right, as noted above, the pivotally mounted link 42 is pivoted in the clockwise direction so that its cut-out engages the bosses 29 on crank arm 28, thus operatively linking the arm 38 and downwardly projecting arm 52 connected to the bell crank 16 to the crank arm 28. Subsequent clockwise pivotal motion of the crank arm 28, by the gear and cam assembly 6 which also controls cams 106, 162, 172, and 178, will pull the arm 38 to the right, thus effecting counterclockwise pivoting of the bell crank 16. Such movement raises rack 144 and lowers rack 146, thus driving their respective pinions 148 and 150 in opposite directions. Since the pinions 148 and 150 (not shown) are rigidly connected to rotatably mounted gripper heads 18 and 20 respectively, this movement of the racks 144 and 146 thus rotates the gripper heads 18 and 20, which are gripping the opposed fruit body halves, in opposite directions to effect the torquing separation of the two peach halves from one another and from the gripped pit in the well known manner.

By the time this separation of the peach body halves from the pit has taken place, the cam 162 has rotated sufficiently to bring its high portion in contact with the cam follower of valve 160, thus again driving it to the left, as indicated in FIG. 7. In this condition the pressurized air causing the diaphragms in the pit gripping heads 18 and 20 to grip the fruit body halves is vented to the atmosphere, thus releasing the grip of the gripper heads upon the peach body halves. At this time also the gear and cam assembly 6 causes the bell crank 32 to rotate counterclockwise, thus moving the arms 12 and 14 and their associated gripper heads apart, to the position illustrated in FIG. 1. With the grip on the peach body halves released, this moving apart of the gripper heads thus permits the fruit body halves to fall free into suitable collecting means. At this same time, the gear and cam assembly urges crank arm 94 in a counterclockwise direction, thus urging push rod 90 forward and pivoting the lower blade assembly 24 away from the upper blade and thus releasing the grip upon the fruit pit. The downward movement of the lower blade assembly 24 is necessarily accompanied by counterclockwise rotation of the actuating arm 88, to which the elongated pit knocker 96 is attached. Thus, the movement of the lower blade away from the upper blade will be accompanied by a sweeping movement of the pit knocker 96 downwardly alongside the upper blade 46 to knock loose any pit stuck in the pit gripping teeth 64 of the upper blade.

The foregoing sequence of events reflects the manner of pitting a fruit having a sound pit. However, in operation, fruits having split pits may be presented to this pitting apparatus intermingled with fruit having sound pits. It is a feature of the present apparatus that either type of fruit may be pitted in any sequence without modification to the apparatus. The manner of sensing and pitting a fruit having a split pit is generally as follows.

Fruit having a split pit is presented to this pitting apparatus in the same manner as fruit having sound pits, with the feeder 26 forcing the fruit between the upper and lower blades 46 and 82, which are spaced apart. The lower blade is pivoted toward the upper blade in the manner described above, and the gripper heads detect the presence of fruit between them and grip and engage the fruit also as described above. However, the presence of a split pit within the fruit will permit the lower blade to continue pivoting toward the upper blade between the halves of the split pit and without being stopped by engagement with a sound pit. Thus, under the urging of crank arm 94 and push rod 90 the lower blade assembly will over-rotate as shown in FIG. 5 to bring cutting edges 52 and 84 together and bring the actuating finger 166 into engagement with normally closed valve 168 and open that valve. Thus, pressurized air will be in the line between valve 168 and valve 174 when the bump on cam 172 opens valve 170.

With pressurized air bearing against the left side of the bobbin of valve 174, this bobbin will be driven to the right. Upon this movement of the valve 174 bobbin to the right pressurized air will be provided to conduits 184 and 186, thus driving the pistons of air cylinders 128 and 44 to the left.

When the piston of cylinder 44 is driven to the left, the pivotally mounted link 42 will be swung upwardly, disengaging it from the boss 29 on crank 28. This upward pivoting will also bring pin 188 on link 42 up into the arcuate slot 190 of member 192, which is rigidly affixed to the pitting apparatus chassis. By the engagement between the pin 188 of link 42 and the member 192 affixed to the apparatus chassis, the link 38 is secured against any movement relative to the chassis. Thus, this engagement serves to secure the bell crank 16 against any rotating movement, preventing any relative movement of the racks 144 and 146, so that there will be substantially no torquing rotation of the pit gripping heads 18 and 20 and maintaining the fruit body halves stationary during the pitting of such a split pit fruit.

By the provision of pressurized air to line 184, the piston of cylinder 128 is driven to the left, thus moving cross link 122 to the forward end of slot 124 on arm 116. With the cross link in this position, the member 108 will butt against the cross link 122 when urged counterclockwise by the cam 106, thus pivoting the arm 116 downwardly and moving the blocking member 117 out of the way of tooth 120 while pulling latching arm 112 down to catch boss 134, as illustrated in FIG. 6. In this event both the upper and lower jaw assemblies, which are pivotally mounted to pivot shaft 50, may pivot downwardly being pulled by latching arm 112, moving the cutting edges 52 and 84 and pit-gripping teeth 54 and 85 through the fruit and away from the split pit to a position remote therefrom. This movement continues until the arm 80 engages the stop 132. This stop is so positioned to bring the coring spoon aperture in upper blade 46 into position adjacent the split pit of the gripped fruit, shown in phantom in FIG. 6. During this movement the thin, U-shaped coring spoon 60, which preferably is no wider than the thickness of the upper blade 46, is effectively shrouded by that blade so that there is no damage to the fruit during the movement of the blade assemblies and coring spoon through the fruit.

When the aperture of blade 46, and thus the coring spoon 60, have been brought from their position distal the split pit of the fruit (FIG. 5) to the position of FIG. 6 adjacent the split pit, the rotary actuator 78 and its housing 72, which are mounted to the upper blade support 48 is pivoted from the solid line position of FIG. 4 to the broken line position in that figure. This upward pivoting of the rotary actuator 78 and its associated housing 72 thus brings the housing 72 into engagement with valve 194, opening that valve and allowing a supply of pressurized air to pass therethrough. This supply of pressurized air thus drives valve 196 (FIG. 7) to the right, supplying pressurized air to the conduit 198 leading to rotary actuator 78. This air thus effects a rapid rotation, of the rotary actuator 78, thus rotating the coring spoon 60 through a complete revolution about the axis defined by the shafts 58 and 62 which axis extends generally through both blossom end and stem end of the fruit, the rotation of the coring spoon 60 defining a complete body of revolution. This rotation of coring spoon 60, alone, effectively cuts a core, including the split pit, from the fruit body, such core corresponding to the body of revolution described by rotation of the coring spoon 60. During this coring operation the blade assemblies have been latched in place first by engagement between the hooked end portion of member 112 and the boss 134 on arm 80 and then by the engagement between the blocking member 117 and the tooth 120 at the lower end of arm 80.

Upon completion of the core cutting rotation of the coring spoon 60, the action of the cam assembly will release the grip of the gripper head on the fruit body halves and move the gripper heads away from the fruit to release the cored fruit halves, in the manner described above.

The continued rotation of cam 106, along with the other rotary components of the apparatus, will bring the second high lobe of the cam 106 into engagement with the cam follower of arm 100 to effect counterclockwise pivoting of the member 108 and thus of the arm 116 with its blocking portion 117. Such pivoting will again move the blocking arm 117 to a lowered position, releasing its engagement with the tooth 120 of member 80. The other track of cam 106 will at that time begin urging the cam follower 111 of member 110 to pivot in a counterclockwise direction in FIGS. 5 and 6, thus urging the latching member 112 forward and, by its engagement with surface 135, necessarily driving the boss 134 on member 80 forward as well. By this forward motion the member 80 will be pivoted in a clockwise direction about pivot shaft 50, thus raising and restoring the blade assemblies 22 and 24 to their original raised position against fixed stop 131, illustrated in FIG. 5. Such pivotal movement of the member 80 will also swing the rotary actuator 78 downwardly, away from its position engaging and actuating valve 194 to its lower position, engaging and actuating valve 200 (FIGS. 4 and 7). Upon the opening of valve 200 pressurized air will then flow through the line to the pilot on the right hand side of valve 196, again driving it to the left hand position illustrated in FIG. 7. In this position the pressurized air is vented from line 198 and is introduced to line 202, thus effecting a "unwinding" rotation of the actuator 78 and thus spoon 60, restoring it to its original position which it assumed before its corecutting rotation. Such "unwinding" rotation of the spoon 60 will serve not only to restore the spoon to its original alignment within the aperture of blade 46 but also will serve to eject the pit-carrying core so that it may fall free into a suitable receptacle.

With the blade assemblies again raised to their upper position, counterclockwise pivoting of the crank arm 94 will move the push rod 90 forward and pivot the lower jaw assembly 24 to its open position, illustrated in FIG. 4, whereupon the entire pitting and feeding operation described above may be repeated.

It may be noted that the raised lobe on cam 178 is positioned later in the cycle from the raised lobe on cam 172. Thus, after any actuation of valve 170 by cam 172, moving the valve 174 bobbin to the right, the raised lobe on cam 178 will momentarily open valve 176. This opening of valve 176 will introduce pressurized air to the right-hand side of valve 174 and again drive it toward the left-hand position illustrated in FIG. 7. In this condition pressurized air will be supplied through valve 174 to conduits 180 and 182, maintaining the apparatus in the configuration illustrated in FIG. 7 unless pressurized air is supplied through valves 170 and 168 to the left-hand side of valve 174. The raised lobe on cam 172 which opens valve 170 is positioned to coincide with the early part of the closing of valve 168 so that pressurized air is provided to valve 168 only during that relatively brief portion of the operating cycle of this apparatus. Accordingly, unless the blade 82 moves into the space between the halves of a split pit at this time, before any rotation of the gripper heads 18 and 20, the valve system will not permit air to flow into lines 184 and 186. The result of this requirement is that the above-described spoon pitting operation, in which the bell crank 16 is locked in position, is provided only if the split pit is detected near the beginning of the cycle and before any movement of bell crank 16 and thus any rotation of the fruit body gripper heads 18 and 20. Thus, if the pit gripping teeth 54 and 85 of the blades 46 and 82 momentarily engage and grip the edges of an apparently sound pit and then at some subsequent time, such as during rotation of the gripper heads 18 and 20, move past the pit gripping position between the halves of the pit, indicating that it has split, the blade and coring spoon shifting and actuating apparatus will be disabled and not brought into action. This provision necessarily will result in the torque pitting and splitting without removal of a certain number of unsound pits although the number of such split and non-removed pits will be relatively small.

While the foregoing describes a preferred embodiment of the apparatus of this invention, it is to be recognized that numerous variations and modifications of this apparatus, all within the scope of the present invention, will readily occur to those skilled in the art. Thus, the foregoing description is intended to be illustrative only of the principles of this invention and is not to be considered limitative thereof, the scope of this invention being defined solely by the claims appended hereto and including all equivalents to the claim structure.

What is claimed is:

1. Apparatus for bisecting and pitting fruit of the drupe type, comprising
    a pair of generally coplanar body-bisecting blades having opposed cutting edges;
    means for supporting said blades to receive such a fruit and, upon said fruit being positioned between said blades with its suture generally in said plane, for moving one blade toward the other in said plane to engage said pit in either a first position in which said blades are in gripping relation to a sound pit or past said first position to a second position with at least one said blade within a split pit;
    fruit gripping means disposed adjacent opposite sides of said plane and supported for movement into coaxial gripping relation with the halves of a fruit, the body of which is bisected by said blades and the pit of which is engaged by said blades, and means for so moving said gripping cups and for rotating them about their mutual axis upon the gripping engagement of a sound pit by said blades for shearing said fruit halves from said sound pit;
    a generally U-shaped coring spoon mounted to one of said blades for rotation about an axis extending transverse to the legs of the U, said coring spoon being dimensioned such that rotation about said transversely extending axis will describe a body of revolution at least as large as said pit;
    means responsive to the movement of said one blade to said second position for shifting said blades and said coring spoon from said second position, in which said coring spoon is remote from said pit, to a third position in which said blade cutting edges are remote from said pit and in which said coring spoon is adjacent said gripped fruit halves and extending adjacent a portion of said pit; and
    coring spoon actuating means operatively connected to said coring spoon for rotating said coring spoon about said spoon axis of rotation when said blades and said coring spoon are shifted to said third position, whereby rotation of the coring spoon will cut the split pit from the fruit halves.

2. The apparatus of claim 1 wherein said coring spoon is mounted within an aperture extending through one of said blades, whereby the blade serves to shroud the coring spoon as the blade and spoon are shifted through the fruit to the third position.

3. In apparatus for pitting fruits of the drupe type wherein fruit-bisecting blades having pit gripping means associated therewith move relatively toward each other in substantially the suture plane of the fruit to substantially bisect the fruit to its pit, said pit gripping means grip the edges of a sound pit and hold said pit against rotation, and thereafter fruit gripping means grip and rotate the fruit halves relative to the held sound pit to shear said fruit halves from said sound pit, the improvement comprising a coring spoon mounted within an aperture through one of said blades for rotation about an axis extending through said coring spoon, said aperture and coring spoon being spaced from said pit gripping means and said coring spoon being dimensioned such that rotation of said coring spoon alone about said axis describes a complete body of revolution at least as large as said pit;

said blades and said coring spoon being mounted for movement between a torque pitting position, in which pit gripping means engages and grips a sound pit and said coring spoon is remote from said pit, and a spoon pitting position in which said coring spoon is adjacent said pit and said pit gripping means are remote from said pit; and means, responsive to the movement of one of said pit gripping means past the edges of a split pit, for moving said blades and said coring spoon from said torque pitting position to said spoon pitting position, whereby, upon rotation of said coring spoon alone about its axis of rotation, the coring spoon will cut a core corresponding to said body of revolution and including the split pit from the fruit halves.

4. Apparatus for bisecting and pitting fruit of the drupe type, comprising a pair of generally coplanar body-bisecting blades having opposed cutting edges;

means for supporting said blades to receive such a fruit and, upon said fruit being positioned between said blades with its suture generally in said plane, for moving one blade toward the other in said plane partially through said fruit to engage said pit in either a first position in which said blades are in gripping relation to a sound pit or past said first position to a second position with at least one said blade within a split pit;

fruit gripping means disposed adjacent opposite sides of said plane and supported for movement into coaxial gripping relation with the halves of a fruit, the body of which is bisected by said blades and the pit of which is engaged by said blades, said means for so moving said gripping cups and for rotating them about their mutual axis upon the gripping engagement of a sound pit by said blades for shearing said fruit halves from said sound pit;

a coring spoon mounted to one of said blades for rotation about an axis extending through said coring spoon, said coring spoon being dimensioned such that said rotation about said axis will describe a body of revolution at least as large as said pit, and said coring spoon being mounted within an aperture which extends through said blade and which is spaced from said blade cutting edge, whereby the blade portion between the cutting edge and the aperture serves to shroud the coring spoon during movement of the blade through the fruit;

means responsive to the movement of said one blade to said second position for shifting said blades and said coring spoon from said second position, in which said coring spoon is remote from said pit, to a third position in which said blade cutting edges are remote from said pit and in which said blade aperture and coring spoon are adjacent said gripped fruit halves and adjacent a portion of said pit; and coring spoon actuating means operatively connected to said coring spoon for rotating said coring spoon about said spoon axis of rotation when said blades and said coring spoon are shifted to said third position, whereby rotation of the coring spoon will cut the split pit from the fruit halves.

5. The apparatus of claim 4 further comprising means for disabling said rotation of said fruit gripping means upon the sensing of a split pit, whereby the halves of a fruit having a split pit may be held substantially stationary during the operation of the coring spoon to cut a split pit from the fruit halves.

6. The apparatus of claim 4 further comprising means for automatically disabling said blade and coring spoon shifting means if no split pit is detected prior to the initiation of rotation of said fruit-gripping cups.

7. The improvement of claim 6 further comprising means for disabling rotation of said fruit gripping means in response to said movement of one of said pit gripping means past the edges of a split pit.

8. The improvement of claim 6 further comprising means for disabling said responsive blade and coring spoon moving means upon the movement of said pit gripping means past the edges of a split pit unless said movement of said pit gripping means occurs prior to the initiation of rotation of said pit gripping means.

* * * * *